United States Patent [15] 3,660,240
Chappelle et al. [45] May 2, 1972

[54] FLAVIN CO-ENZYME ASSAY

[72] Inventors: Emmett W. Chappelle, Baltimore; Grace L. Picciolo, Bladensburg, both of Md.

[73] Assignee: The United States of America as represented by the Administrator of the National Aeronautics and Space Administration

[22] Filed: May 5, 1969

[21] Appl. No.: 822,039

[52] U.S. Cl. .....................195/103.5 R, 195/28 N, 260/211.5
[51] Int. Cl. .......................................................G01n 31/14
[58] Field of Search ....................195/130.5, 28 N; 23/230 B; 260/211.5

[56] References Cited

UNITED STATES PATENTS 2,973,305 2/1961 Masuda et al. ........................195/28 N

OTHER PUBLICATIONS

Strehler; B. L., " Methods of Biochem. Anal." , Glick, ed., Vol. 16, (1968) pp. 134– 139
Conn et al., " Outlines of Biochem." , 2nd Ed. (1967) p. 164
Colowick et al., " Methods in Enzymology" , Vol. II, p. 856– 7 (1955)
Picciolo et al., " BioScience" 18(5):427– 8 (1968)

*Primary Examiner*—A. Louis Monacell
*Assistant Examiner*—Max D. Hensley
*Attorney*—R. F. Kempf, E. Levy and G. T. McCoy

[57] ABSTRACT

Flavin coenzymes, the active forms of vitamin $B_2$, are assayed by using boiling perchloric acid to rupture bacterial cells, free the flavin from protein, and hydrolyze flavin adenine dinucleotide to flavin mononucleotide, which is reduced with sodium borohydride and palladium chloride and reacted with the enzyme luciferase to produce light with intensity directly proportional to flavin concentration.

11 Claims, No Drawings

FLAVIN CO-ENZYME ASSAY

The invention described herein was made by employees of the United States Government and may be manufactured or used by or for the United States Government for governmental purposes without the payment of any royalties thereon or therefor.

This invention relates to a technique for the quantitative determination of flavin coenzymes, the active forms of vitamin $B_2$, in bacteria and all forms of life. It further relates to an assay technique suited for the detection of life. More particularly, it relates to an assay technique for the detection of extraterrestrial life forms suited for utilization in manned or unmanned space vehicles. It also relates to an assay technique for the determination of flavin coenzymes which is highly specific and selective, rapid, and which has a high level of sensitivity.

The ubiquitous flavin coenzymes, flavin adenine dinucleotide and flavin mononucleotide, referred to hereinafter as FAD and FMN, respectively, are of considerable interest in nutrition and metabolic research generally and in the detection of life forms. For example, it has been suggested that flavin coenzyme assay could be utilized to detect extraterrestrial life forms via space vehicles. A simple, reliable, and sensitive assay technique is accordingly highly desirable.

Assay techniques currently available suffer from one or more significant disabilities. Fluorometry, which is widely used, is the most sensitive and accurate, but suffers from a lack of specificity. The interference of other compounds, such as chlorophyll, pterines, alloxan, benzo [$\alpha$] pyrene, and the like, which have similar excitation and fluorescence maxima, necessitate extensive, cumbersome, and tedious purification procedures. Enzymatic assays have been utilized which are more specific than fluorometry, but have a level of sensitivity completely inadequate for meaningful research in metabolism. Paper chromatography has also been used with a similar lack of sensitivity. For a comparison of these features, Table I lists the sensitivity and selectivity of these techniques.

TABLE I

FMN Assay

| Method | Lower Limit of Detection ($\mu$g.) | Specificity |
|---|---|---|
| Paper Chromatography [1] | 0.01 | yes |
| Cytochrome C Reductase [1] | 0.01 | yes |
| Lactic Oxidase [2] | 1 | yes |
| Fluorometry [3] | 0.0001 | no |

1. Huennekens et al., "Methods in Enzymology," Colowick et al., eds., Vol. III, p. 950, p. 957 Academic Press, New York 1957.
2. Bergmeyer (ed.) "Methods of Enzymatic Analysis," Academic Press, New York, 1965, p. 599
3. Burch, "Methods in Enzymology" Colowick et al., eds., Vol. III, p. 960, Academic Press, New York 1957.

It is readily apparent from Table I that the currently available techniques are not adequate research tools, particularly for extraterrestrial life detection systems, fluorometry because of the lack of specificity and the consequent requirement for extensive purification of samples, the others because of the lack of sensitivity and the attendant lack of accuracy and requirements for bulky, large samples. The need for a rapid, simple, sensitive and selective assay for the determination of flavin coenzymes is clear.

It is accordingly an object of the present invention to provide a technique for the quantitative determination of flavin coenzymes. A further object of the present invention is an assay technique for the specific determination of flavin coenzymes. A still further object is the provision of a highly sensitive, assay technique for the determination of flavin coenzymes. All these and still other objects, apparent from the following description, are realized by the method of the present invention.

In the present invention, a technique is provided for the specific assay of flavin coenzymes having a lower limit of detection for flavin mononucleotide of 0.00001 $\mu$g, which when compared to the values and specificity of the techniques of the prior art, in Table I, above, remedies the substantial difficulties encountered in obtaining meaningful analysis. The process requires a simple treatment of the sample to rupture the cells and to free the flavin coenzymes from the associated proteins. If a total flavin coenzyme assay is desired, the treatment is conducted under conditions such that flavin adenine dinucleotide is hydrolyzed to flavin mononucleotide, or the unhydrolyzed sample can be assayed for flavin mononucleotide alone, as desired. The prepared sample is further treated under reducing conditions to provide the necessary reduced form of flavin mononucleotide, which is then reacted with the enzyme luciferase in a light-producing reaction. Under the controlled conditions of the present process, the intensity of the emitted light is in direct, linear proportion to the concentration of flavin mononucleotide (in reduced form). Measurement of the light intensity by known techniques, utilizing readily available means, thus provides a very sensitive and specific measure of the concentration of reduced flavin mononucleotide in the sample.

The sample is prepared for assay by forming an aqueous cellular dispersion of the sample and treating the dispersion with a strong aqueous perchloric acid. The perchloric acid ruptures the cells and frees the flavin coenzymes from their associated proteins. At lower temperatures, e.g., about 2°C, the cells are readily ruptured and the FAD and FMN are freed from protein, but no significant hydrolysis of the FAD occurs. At higher temperatures, e.g., about 100°C, FAD is rapidly hydrolyzed to FMN, in about 30 to 60 minutes at the boiling temperature, for example. It is readily apparent that the assay can be selective for FMN or general for flavin coenzymes, depending on the temperature at which the perchloric acid treatment is conducted. Generally, the higher the perchloric acid treatment temperature, the more rapid is the hydrolysis of the FAD. It is accordingly preferred to operate at the extreme limits of the temperature range, depending on the determination to be made, i.e., at the boiling point for total flavin coenzyme assay so that the hydrolysis of FAD proceeds most rapidly, and at near freezing for the selective assay of FMN so that hydrolysis of FAD is minimized. The perchloric acid used in the treatment will be at a convenient strength, e.g., about 1N, to facilitate preparation of standard solutions of sufficient strength to rupture the cells, free the flavins from protein, and, if desired, to hydrolyze FAD. The extraction (and hydrolysis, if utilized), and subsequent assay steps should preferably be conducted with minimal exposure to light. It is also preferred that all equipment which contacts the sample being processed be constructed of polypropylene to minimize surface adsorption and degradation of the flavins. Mineral acids, other than perchloric acid, may be used, e.g., hydrochloric, nitric, sulfuric acid, etc.; however, perchloric acid is preferred.

The cooled sample is next treated to reduce FMN, occurring in the cellular material or hydrolyzed from FAD. The perchloric acid is neutralized and palladium black or platinum black is provided, e.g., by in situ reduction of palladium chloride or platinum chloride for convenience, in catalytic proportions ranging from 1 to $10^7$ moles per mole of flavin coenzyme present, followed by a buffer to maintain a pH of about 7.0, and the reducing agent, sodium borohydride, is added in an amount sufficient to reduce the FMN present and, if the catalyst is to be produced in situ, then additional reducing agent must be provided. Insufficient $NaBH_4$ gives results in incomplete reduction, while an excess of $NaBH_4$ gives equally bad results for reasons which are not completely understood, although it is thought that an excess of the reagent may inhibit enzymatic action. The $NaBH_4$ should be added in solution in a slightly alkaline aqueous medium, freshly prepared to avoid degradation, in molar proportions in excess of the content of FMN by a factor of up to 10,000 on a mole to mole basis.

The reduced FMN is added, as soon as possible after the completion of the reaction, to the luciferase solution in a context where the intensity of light produced in the reaction can be accurately measured. When the procedures, reagents, and measurements of the procedure are standardized, the intensity of the light emitted in the reduced FMN – luciferase reaction is directly measured in terms of concentration of FMN in the sample.

The luciferase solution to which the prepared sample is added contains a stoichiometric excess of the luciferase enzyme dissolved in a pH 7.0 buffer, maintained at 0°C until use, at which point it is allowed to come to ambient temperature. Also contained in the solution is an excess of a bisulfite addition complex of an alkyl aldehyde, preferably having about 10 to 14 carbon atoms in the alkyl chain. Dodecylaldehyde is readily available and convenient to use. The luciferase and the aldehyde are preferably prepared in separate solutions in the buffered aqueous medium, which are combined just prior to use. Alternatively, separately prepared solutions can be combined, lyophilized, and cold-stored at about −20°C in a dessicator or or the like, where the mixture remains stable indefinitely.

The enzyme luciferase is commercially available, but requires further purification for use in the process of the present invention, as by elution chromatography from a suitable solid, such as the macroscopic beads of synthetic dextran polysaccharides, which are commercially available, as "-Sephadex," from Pharmacia Fine Chemicals, Inc.

Alternatively, the enzyme can be readily produced by cultivation of luciferase-containing photobacteria, such as, for example, *Photobacterium fischeri* ATCC 7744, *P. harveyi* ATCC 12126, *P. pierantonii* ATCC 14546, *P. phosphoreum* ATCC 11040, and *Vibrio albensis* ATCC 14547. Such photobacteria have been cultivated in liquid culture media in large vessels with agitation and aeration, or using agar-culture techniques in large Roux flasks, with recovery on glass beads. It has been discovered that such photobacteria can also be cultivated in large trays, filled with nutrient agar, inoculated with the micro-organisms. Preheating the trays when pouring the agar, results in a uniformly smooth, glassy surface. After growth in a controlled medium, the organisms can be harvested by a simple scraping, with a rubber spatula or the like, and with a minimum of dilution which facilitates subsequent extraction of the enzyme. Growth of the photobacteria can be readily monitored by automated light-detection instrumentation. Harvesting can thus be conducted at the optimum point of growth for the maximum luciferase recovery.

The luminescent bacteria are suspended in cold acetone, e. g., −10°C for 10 minutes, and then filtered through a Buchner funnel or the like, and the filter cake is suspended in a solution 0.05M in tris-hydroxymethyl amino methane sulfonic acid (hereinafter referred to as TES), $10^{-1}$ mg/ml Cleland's Reagent (dithio threitol), a saturated solution of dodecyl aldehydebisulfite complex (1 part per 100 parts by volume based on the volume of the TES), and 10 mg/ml Dextran 200, having a pH of 7.0 hereinafter referred to as DACT. Cleland's Reagent is used to prevent oxidation of the luciferase. The suspension is the centrifuged, e.g., at 800 X G for 20 minutes in a refrigerated centrifuge. The supernatant liquid is then separated by elution chromatography on a suitable medium, e.g., the aforementioned polysaccharides. The recovered luciferase is then ready to make up the stock solution used in the assay by dissolution in 0.05 M TES, or the like, at a convenient concentration, such as 1 mg/ml, and stored in an ice bath until used or combined with the aldehydebisulfite complex and lyophilized.

The reaction of reduced FMN with luciferase is conducted in the absence of extraneous light, e.g., in a closed cell, and exposed to light intensity measuring means, such as a photomultiplier tube cathode, incorporated into appropriate amplification and measuring circuitry and apparatus, in any of the well-known techniques of the art. Equipment is commercially available which is well suited to the conduct of the light-producing reaction, measurement of the intensity of the light, with readout in any convenient form, such as recorder printing, oscilloscope, digital readers, and the like. Such measuring equipment is well known and does not comprise a part of the present invention.

As with any frequently used analytical technique, it is, of course, preferred to standardize procedures, reagents, and measurements, so to facilitate the operation of the assay as much as possible, so that routine operations can be conducted by workers with lesser skills with the necessary accuracy and reproducibility for meaningful research results, and so that the operations can be automated for utilization in foreign environments, such as in space vehicles intended for the examination of materials for extraterrestrial life forms. In accordance with the foregoing criteria, the invention will be described as a specific embodiment utilizing convenient standard procedures and reagents, and readily available, commercial instrumentation for measurement.

The following standard reagents are utilized in the preferred embodiment of the assay process of the present invention. Those which must be freshly prepared or which must be stored under particular conditions to insure proper response are so designated.

1. Perchloric acid ($HClO_4$), 1 N.
2. Palladium chloride ($PdCl_2$) 0.002 M in 1 N KOH.
3. Sodium borohydride ($NaBH_4$) 0.5 M in 0.2 percent KOH, prepared fresh immediately before use, must be stored absolutely dry prior to use.
4. TES buffer (Tris-hydroxymethyl amino methane sulfonic acid) 0.2 M, pH 7.0.
5. Luciferase 1 mg/ml in TES buffer, Cleland's Reagent, and Dextran combined with dodecyl aldehyde solution immediately before use, or combined, lyophilized, and stored at −20° to −80°C, hydrolyzed and brought to about 25°C (ambient temperature) immediately before use.
6. Dodecyl aldehyde bisulfite complex 2 ml dodecyl aldehyde is added to 100 ml saturated sodium bisulfite and treated with 5 ml methanol to precipitate the addition complex, which is filtered, washed with three 50 ml volumes of ether and air dried. A saturated solution of the complex is prepared in the TES buffer and is stable for about 8 hours.
7. Flavin Mononucleotide (FMN) 1 mg/ml in the TES buffer. Stable for about one month, must be stored in dark and cold, e.g., about 0°–2°C. Used for the preparation of standard curves.

The light-measuring instrumentation used was provided with a light-tight reaction chamber in which a small, calibrated test tube containing the luciferase solution can be positioned in front of the cathode surface of a photomultiplier tube, and with a rubber septum which permits injection of the prepared FMN sample into the luciferase without affecting the light-tight integrity of the chamber.

The following operating procedure was utilized for the determination of total intracellular flavin coenzymes (FAD and FMN); the same procedure would be followed for the selective determination of FMN except that the boiling of the cellular suspension and perchloric acid mixture would be omitted and the sample maintained at 2°C instead.

One ml. of a cellular suspension of the material to be assayed, containing sufficient cellular material to contain a total flavin coenzyme content of from about 100 to 0.001 $\mu$g and 1 ml $HClO_4$ are combined and brought to a boil, which is maintained for about 30 to 60 minutes, and the mixture is then cooled. To the cooled suspension is added 1 ml of the $PdCl_2$ solution, which neutralizes the $HClO_4$. The suspension, after standing about 5 minutes, which now comprises about 3 ml, is combined with 6 ml of the TES buffer, followed by 1 ml of the $NaBH_4$ solution. Of the 10 ml of reduced FMN thus provided, 0.1 ml are injected into 0.3 of the luciferase solution previously placed in the reaction chamber. Since one-one hundredth of the original sample is actually measured, the amount of material reacted with the luciferase is between about 1.0 and 0.00001 $\mu$g, which are the approximate limits to the linear relationship between FMN concentration and light-intensity.

The amount of sample material to be used is readily and simply determined from the known approximate concentration of flavin enzymes in various materials, as illustrated by the known values of Table II, below, resulting from the employment of the assay method of the present invention. The values in Table II were obtained using the standardized procedure outlined above as the preferred embodiment of the method of the invention. These values exemplify the specificity and sensitivity of the assay method. Samples of the bacterial materials dispersed in water were prepared containing about 100,000 cells per milliliter to provide the required amount of flavin coenzymes for assay, while in the case of whole blood, for example, a cellular dispersion containing about 0.1 ml per ml. of aqueous sample proved sufficient. The results were quantitated by the preparation of a standard curve using the standardized stock solution of FMN in the procedure, as is well known in the art.

TABLE II

FMN Concentration in Biological Material

| Material | μg./Cell[a] or ml. |
|---|---|
| *Bacillus globigii* | $3.0\times10^{-11}$ |
| *Bacillus globigii spores* | $3.0\times10^{-11}$ |
| *Brevibacterium helvolum* | $9.0\times10^{-10}$ |
| *Escherichia coli* | $1.9\times10^{-10}$ |
| *Flavobacterium arborescens* | $6.54\times10^{-11}$ |
| *Klebsiella pneumoniae* | $1.8\times10^{-10}$ |
| *Micrococcus lysodeikticus* | $2.1\times10^{-11}$ |
| *Pseudomonas aeruginosa* | $1.8\times10^{-10}$ |
| *Pseudomonas fluorescens* | $2.6\times10^{-10}$ |
| *Proteus vulgaris* | $1.4\times10^{-10}$ |
| *Serratia marcescens* | $1.6\times10^{-10}$ |
| *Spirillum serpens* | $2.0\times10^{-9}$ |
| *Staphylococcus aureus* | $7.0\times10^{-9}$ |
| Urine, ml. | $1.0\times10^{-1}$ |
| Whole blood ($5.5\times10^{6}$ rbc/cmm.), ml. | 5.0 |
| Serum, ml. | 1.1 |

a. organisms were assayed during their stationary phase of growth and cell number determined by plate count on tryptic soy agar.

From the foregoing Table II, it is readily apparent that an assay technique with the sensitivity and specificity provide by the method of the present invention is far superior to the techniques of Table I, supra. Particularly in the quantitative analysis of flavin coenzymes in microorganisms and the vitamin $B_2$ content of foods does the process of the present invention excel, and it is in just this area that the most meaningful research can be conducted in the fields of flavin metabolism, nutrition and in exploration for extraterrestrial life forms. In the future, however, the process of the present invention could become an important diagnostic tool in the detection and quantitation of metabolic disorders, and it is accordingly not desired to limit the scope of the invention to any particular utility or narrow mode of operation. Rather it is intended that the invention be construed broadly as an analytical technique, limited only by the following claims.

What is claimed is:

1. A specific and sensitive method for the assay of intracellular flavin co-enzymes in biological materials comprising preparing an aqueous cellular dispersion of said biological material, contacting said cellular dispersion with strong aqueous mineral acid to rupture the cells and free the flavin coenzymes from proteins, neutralizing the mineral acid, adding a catalytic amount of a reducing catalyst comprising palladium black, or platinum black, reducing flavin mononucleotide with a stoichiometric excess of sodium borohydride of up to about 10000 on a mole to mole basis, and reacting the reduced flavin mononucleotide in the dark with a solution of bacterial luciferase and an alkyl aldehyde, having up to 14 carbon atoms in the alkyl group, in a reaction which emits light with an intensity directly proportional to the concentration of the reduced flavin mononucleotide.

2. The method of claim 1 wherein said cellular dispersion is contacted with said mineral acid at about the boiling point until flavin adenine dinucleotide is hydrolyzed to flavin mononucleotide and then cooled to ambient temperature before neutralization of the mineral acid.

3. The method of claim 2 wherein said contacting is maintained at about boiling point for about 30 to 60 minutes.

4. The method of claim 1 wherein said cellular dispersion is contacted with said mineral acid at a temperature of about 2°C to avoid substantial hydrolysis of flavin adenine dinucleotide.

5. The method of claim 1 wherein said cellular dispersion contains from about 100 to 0.001 μg/ml of said flavin coenzymes.

6. The method of claim 1 wherein said alkyl group contains 10 to 14 carbon atoms.

7. The method of claim 1 wherein said alkyl aldehyde is dodecyl aldehyde.

8. The method of claim 1 wherein said emitted light is measured by automated instrumentation.

9. The method of claim 1 wherein said alkyl aldehyde is in the form of a bisulfite addition complex.

10. The method of claim 1 wherein said mineral acid is perchloric acid.

11. The method of claim 5 wherein 1 milliliter of 0.5M $NaBH_4$ in 0.2 percent KOH is utilized for each milliliter of said cellular dispersion.

* * * * *